US007445244B2

(12) United States Patent
Taylor

(10) Patent No.: US 7,445,244 B2
(45) Date of Patent: Nov. 4, 2008

(54) SEAT BELT ANCHOR

(75) Inventor: Jeffrey Carroll Taylor, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 11/308,451

(22) Filed: Mar. 27, 2006

(65) Prior Publication Data

US 2007/0222272 A1 Sep. 27, 2007

(51) Int. Cl.
*B60R 22/20* (2006.01)

(52) U.S. Cl. .................................................. 280/801.2

(58) Field of Classification Search ............. 280/801.2, 280/808; 297/482, 483

See application file for complete search history.

(56) References Cited

U.S. PATENT DOCUMENTS 4,091,508 A * 5/1978 Yamada et al. ................ 24/171
4,451,087 A 5/1984 Tamamushi
4,552,408 A * 11/1985 Ono ........................... 297/483
4,556,255 A * 12/1985 Kawai ........................ 297/483
4,611,854 A * 9/1986 Pfeiffer ...................... 297/468
4,643,449 A 2/1987 Sasaki et al.
4,682,790 A 7/1987 Katsuno et al.
4,697,827 A 10/1987 Sasaki et al.
4,708,367 A * 11/1987 Yoshitsugu ................. 280/804
5,016,916 A 5/1991 Yokote et al.
5,415,430 A 5/1995 Valasin
6,033,030 A 3/2000 Valasin
6,843,143 B2 * 1/2005 Steele et al. ........... 73/862.393

* cited by examiner

*Primary Examiner*—Faye M. Fleming
(74) *Attorney, Agent, or Firm*—Dickinson Wright PLLC; Greg Brown

(57) ABSTRACT

A seat belt anchor ("anchor") for a vehicle. The anchor is comprised of a bracket and a pair of nested plates. The bracket has a first plate portion and a second plate portion extending from the first plate portion. The second plate portion is attached to the nested plates, which extend substantially across the second plate portion. The nested plates are comprised of an intermediate plate and an outer plate. The intermediate plate is fixedly attached to the second plate portion. Also, the outer plate is rotatably attached to the intermediate plate.

12 Claims, 3 Drawing Sheets

10 22 14 30 18 20 24 28 66a 46 62a 44 34 36 66b 62b 40 16 26 12 32 L

L
10
12
14
16
18
20
22
24
26
28
30
32
34
36
40
44
46
62a
62b
66a
66b

SEAT BELT ANCHOR

BACKGROUND OF THE INVENTION

The present invention relates to a vehicle seat in which a universal seat belt anchor is readily adapted for fixedly or rotatably attaching belt webbing to a side structure.

Vehicles typically include seat belt anchors that are either fixedly attached to a vehicle structure, such as a floorpan, or rotatably attached to the same. Modifying existing anchors to change between fixed and rotatable anchorage typically requires significant alterations in those constructions.

A known anchor comprises a plate rotatably attached to the vehicle structure by a shoulder bolt. This plate has a hole that receives the shoulder bolt. The plate also has a tab, which extends into an arcuate slot formed within the vehicle structure.

In this respect, the plate pivots on the shoulder bolt within a range of motion defined by the tab and the arcuate slot. The arcuate slot typically does not weaken the strength of a substantially large vehicle structure, e.g. a floorpan, as the omitted material forms merely a small fraction of that structure.

The present invention allows a seatbelt anchor to be readily adapted for rotatably or fixedly attaching to a generally small vehicle structure while maintaining the integrity of that structure while minimizing manufacturing costs.

SUMMARY OF THE INVENTION

A seat belt anchor ("anchor") for a vehicle is provided. The anchor includes a bracket and a pair of nested plates. The bracket has a first plate portion and a second plate portion extending from the first plate portion. The second plate portion is attached to the nested plates, which extend substantially across the second plate portion. The nested plates are comprised of an intermediate plate and an outer plate. The intermediate plate is attached to the second plate portion. The outer plate is rotatably attached to the intermediate plate.

One advantage of the invention is that a seat belt anchor is provided that pivotally attaches a seat belt to a side structure of a vehicle seat and enhances the strength of that side structure.

Another advantage of the invention is that a seat belt anchor is provided that improves the accuracy in detecting belt loading.

Yet another advantage of the invention is that a seat belt anchor is provided that enhances the safety of vehicle occupants.

Still another advantage of the invention is that a seat belt anchor is provided that is efficiently packaged for use in a compact side seat structure for a vehicle.

Another advantage of the invention is that a seat belt anchor is provided that is readily adapted for fixedly attaching a seat belt to a side structure of a vehicle seat.

Other advantages, features & objects of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figure 1:
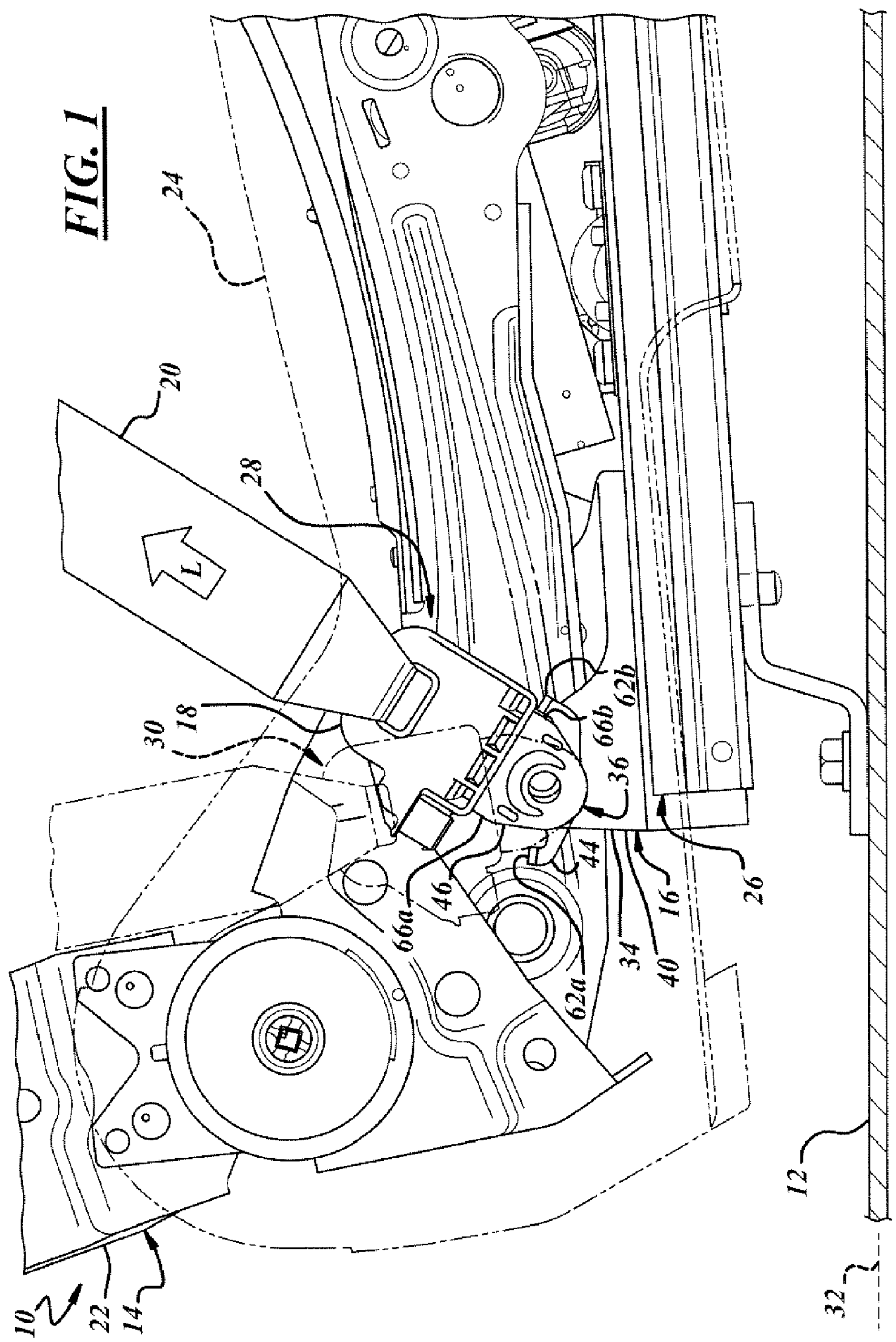
FIG. 1 is an outboard view of a passenger cabin with a vehicle seat and a seat belt anchor, according to one advantageous embodiment of the claimed invention.

In the following figures, the same reference numerals are used to identify the same components in the various views.

The present invention is particularly suited for a seat belt anchor rotatably attached to a vehicle seat. Accordingly, the embodiments described herein employ structural features where the context permits. However, various other embodiments are contemplated having different combinations of the described features, having additional features other than those described herein, or even lacking one or more of those features. For instance, the seat belt anchor can instead be fixedly attached to the vehicle seat, a pillar, or other suitable vehicle structures as desired.

Referring to FIG. 1, there is shown a side view of a vehicle passenger cabin 10 with a floorpan 12, a vehicle seat 14, a seat belt anchor 16 ("anchor"), a tension sensor 18, and webbing 20, according to one advantageous embodiment of the claimed invention. The webbing 20 is attached to the tension sensor 18, which extends from the anchor 16. Further, the anchor 16 is rotatably attached to the vehicle seat 14, which is bolted or otherwise attached to the floorpan 12. Specifically, the vehicle seat 14 is comprised of a seatback 22 and a seat cushion 24, which extends perpendicularly from the seatback 22 and has a side structure 26 with the anchor 16 rotatably attached thereto. In this respect, the anchor 16 is offset a predetermined distance above the floorpan 12.

The anchor 16 can pivot between a forward position 28 and an aft position 30 so as to align the tension sensor 18 with the load (L) in the belt webbing 20. It is understood that the anchor 16 pivots along a longitudinal axis 32 of the floorpan 12. This feature is beneficial for accurately detecting the load (L) in the webbing 20 rather than detecting a fraction of that load (L).

Figure 2:
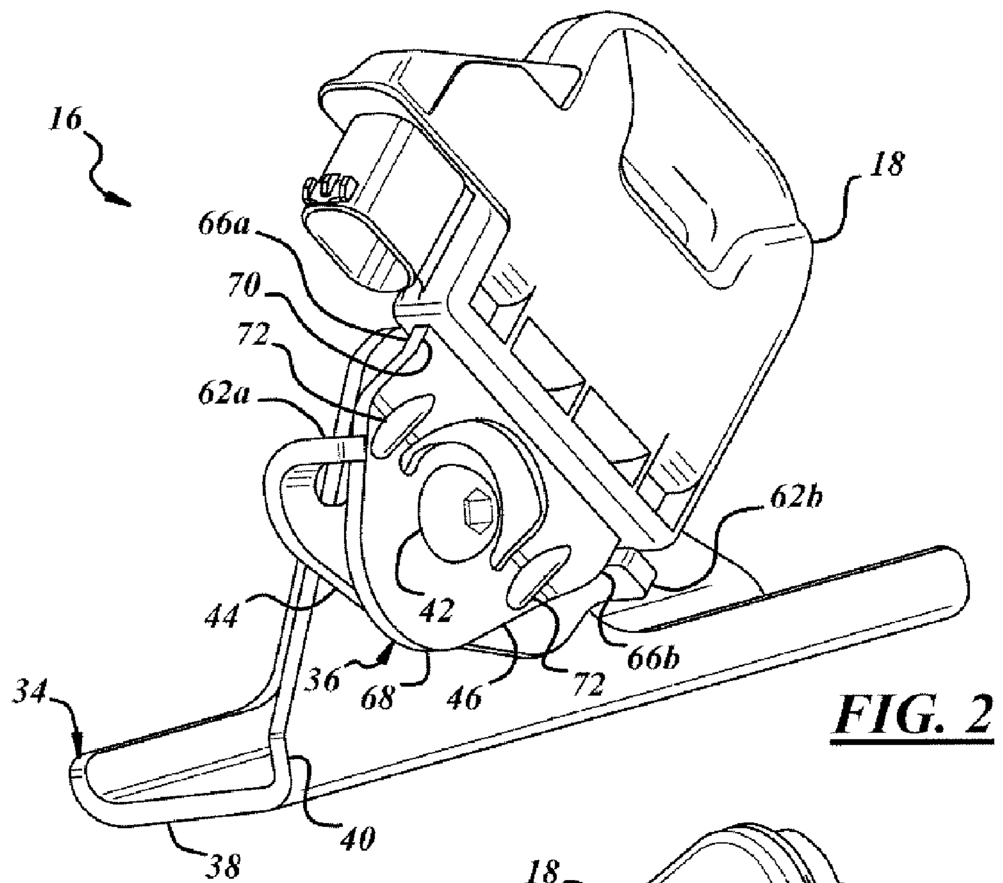
FIG. 2 is a front perspective view of the seat belt anchor shown in FIG. 1.
Figure 3:
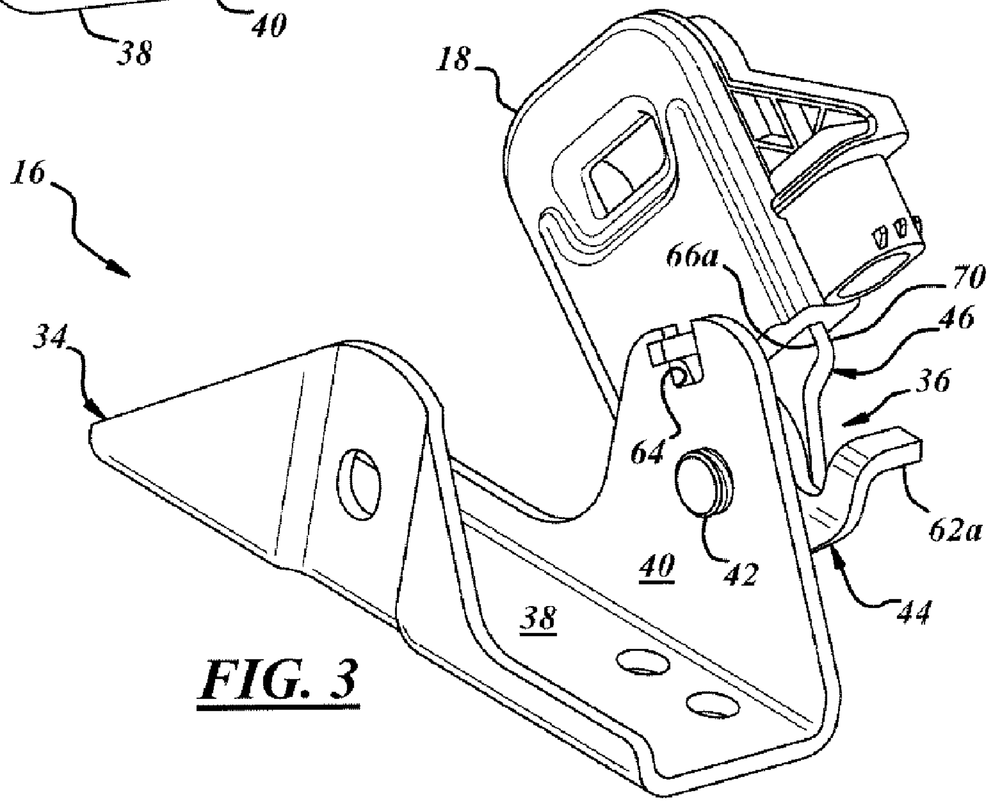
FIG. 3 is a rear perspective view of the seat belt anchor shown in FIG. 1.
Figure 4:
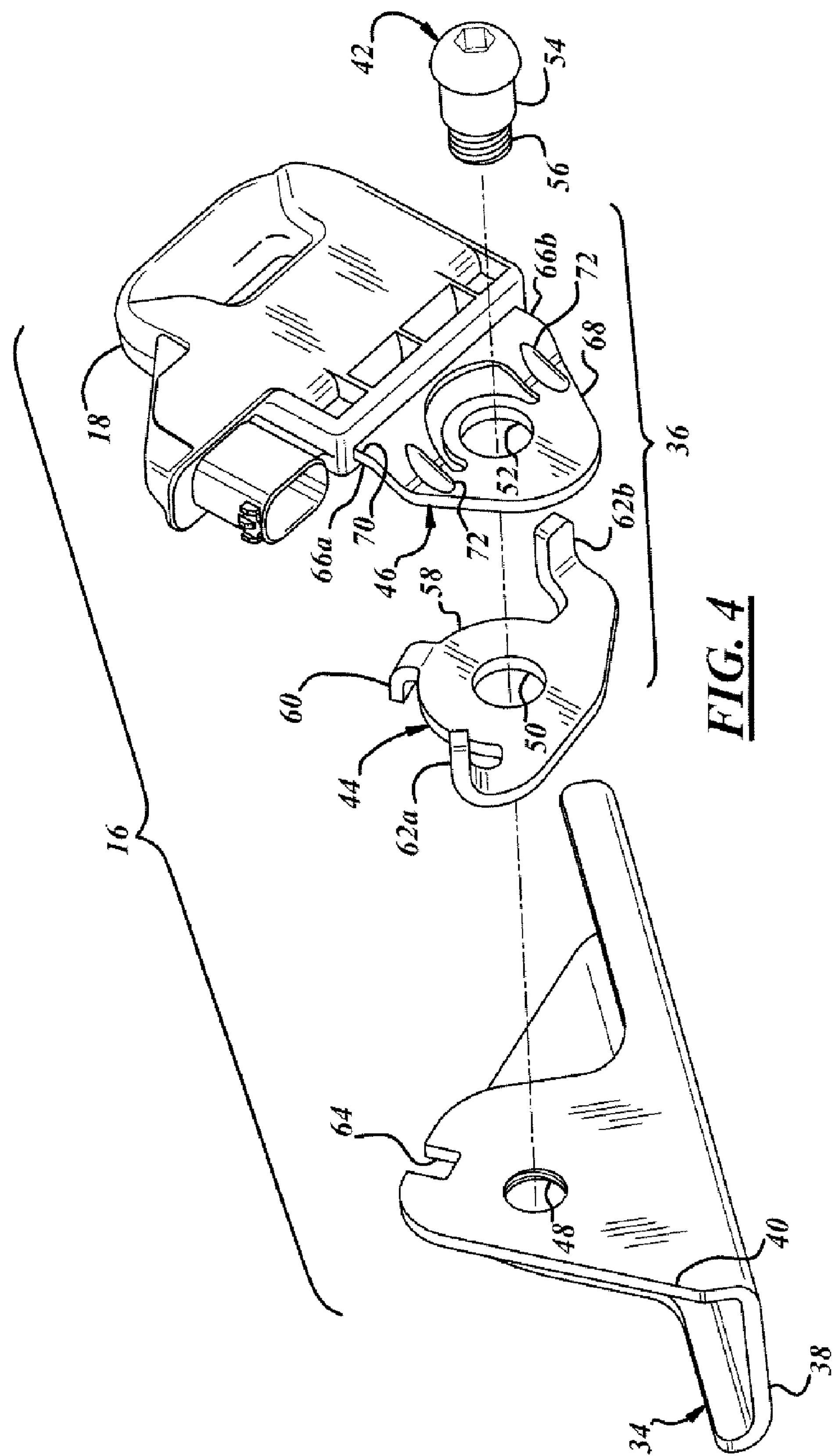
FIG. 4 is an exploded view of the seat belt anchor shown in FIG. 1.

Referring now to the embodiment shown in FIGS. 2 through 4, the anchor 16 is comprised of a bracket 34, a pair of nested plates 36, and the tension sensor 18.

The bracket 34 has a first plate portion 38 and a second plate portion 40 extending perpendicularly from the first plate portion 38. The first plate portion 38 is attached to the side structure 26 of the vehicle seat 14. As detailed below, the second plate portion 40 is attached to the nested plates 36 by a shoulder bolt 42.

Specifically, as best shown in FIG. 4, the nested plates 36 are comprised of an intermediate plate 44 and an outer plate 46. The shoulder bolt 42 extends through a threaded hole 48 formed in the bracket 34, an aperture 50 in the intermediate plate 44, and an opening 52 in the outer plate 46. The shoulder bolt 42 has a cylindrical shaft portion 54 and a threaded shaft portion 56. The threaded shaft portion 56 is fastened to the threaded hole 48 of the bracket 34. Furthermore, the cylindrical shaft portion 54 supports the nested plates 36 and allows the outer plate 46 to rotate without unscrewing the shoulder bolt 42.

As shown in FIG. 1, the outer plate 46, the intermediate plate 44, and the second plate portion 40 of the bracket 34 are substantially perpendicular to the floorpan 12. However, it is understood that the anchor 16 can be positioned a variety of other suitable orientations.

In the embodiment shown in FIGS. 2 through 4, the intermediate plate 44 includes a ring portion 58, a detent tab 60, and a pair of stop tabs 62*a*, 62*b*. The ring portion 58 extends across a substantial portion of the second plate portion 40 and thus distributes the belt load across that second plate portion 40. This feature is beneficial for efficiently supporting a substantial load on a generally small construction.

The detent tab 60 prevents the intermediate plate 44 from rotating on the shoulder bolt 42. To that end, the detent tab 60 extends perpendicularly from the ring portion 58 and into a notch 64 formed in the bracket 34.

Referring to FIG. 1, the stop tabs 62*a*, 62*b* define a range of rotational motion for the outer plate 46 and thus for the tension sensor 18 extending from the outer plate 46. As best shown in FIG. 4, in this embodiment, the stop tabs 62*a*, 62*b* extend perpendicularly from the ring portion 58 and toward the outer plate 46. Also in this embodiment, the stop tabs 62*a*, 62*b* are diametrically opposed from each other about the opening 52 in the ring portion 58. Further, the outer plate 46 has a pair of opposing side portions 66*a*, 66*b* that contact the stop tabs 62*a*, 62*b* and limit rotation of the outer plate 46 on the shoulder bolt 42. It is contemplated that the stop tabs 62*a*, 62*b* and the opposing side portions 66*a*, 66*b* can be otherwise configured for limiting the rotation of the outer plate 46 and the sensor 18 within various degrees of angular motion.

The outer plate 46 has a stepped construction with a base plate portion 68 and an offset plate portion 70. The base plate portion 68 defines the opening 52 and rotates on the shoulder bolt 42. The offset plate portion 70 is parallel to the base plate portion 68 and attached to the tension sensor 18. As introduced above, the tension sensor 18 is in connection between the belt webbing 20 and the outer plate 46. Furthermore, the base plate portion 68 and the offset plate portion 70 have one or more reinforcement members 72 therebetween that strengthen the stepped construction of the outer plate 46.

Also, in this embodiment, the bracket 34 and the nested plates 36 are comprised of steel. However, it is contemplated that these structures can instead be comprised of aluminum, various alloys, or other suitable materials as desired.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A seat belt anchor, comprising:

a bracket having a first plate portion and a second plate portion defining a notch;

said second plate portion extending from said first plate portion; and a pair of nested plates attached to said second plate portion and extending substantially thereacross;

said pair of nested plates comprised of an intermediate plate and an outer plate, with said intermediate plate having a detent tab and at least two stop tabs, with said detent tab extending into said notch in said second plate portion and preventing rotation of said intermediate plate, and with said at least two stop tabs extending toward said outer plate and spaced apart for defining a rotational range of said outer plate;

said intermediate plate fixedly attached to said second plate portion;

said outer plate attached to a tension sensor and rotatably attached to said intermediate plate and adapted for attaching to a seat belt, and with said outer plate having a pair of opposing side portions contacting said at least two stop tabs and retaining said outer plate within said rotational range.

2. The seat belt anchor recited in claim 1, wherein said bracket defines a hole with a bolt member extending therethrough.

3. The seat belt anchor recited in claim 2, wherein said intermediate plate defines an aperture with said bolt member extending therethrough.

4. The seat belt anchor recited in claim 3, wherein aid outer plate defines an opening with said bolt member extending therethrough.

5. The seat belt anchor recited in claim 1, wherein at least one of said bracket, said intermediate plate, and said outer plate is comprised of steel.

6. A vehicle seat, comprising:

a seatback;

a seat cushion extending substantially perpendicularly from said seatback;

a side structure extending from said seat cushion;

said seat belt anchor recited in claim 1, with said first plate portion of said bracket attached to said side structure; and a belt webbing attached to said outer plate by a belt tension sensor.

7. A vehicle passenger cabin comprising:

a floorpan; and said vehicle seat recited in claim 6, with said seat cushion attached to said floorpan;

said seat belt anchor offset from said floorpan.

8. A seat belt anchor comprising:

a bracket having a first plate portion and a second plate portion;

said second plate portion extending substantially perpendicularly from said first plate portion; and a pair of nested plates attached to said second plate portion by a shoulder bolt;

said pair of nested plates extending substantially across said second plate portion of said bracket;

said pair of nested plates comprised of an intermediate plate and an outer plate;

said intermediate plate fixedly attached to said second plate portion;

said outer plate rotatably attached to said intermediate plate;

said second plate portion of said bracket defining a hole;

said intermediate plate defining an opening;

said outer plate defining an aperture;

said shoulder bolt extending through said hole, said opening, and said aperture;

said intermediate plate having a ring portion with a detent tab and at least two stop tabs;

said detent tab extending substantially perpendicularly from said ring portion;

said at least two stop tabs extending substantially perpendicularly from said ring portion distal to said detent tab;

said at least two stop tabs are diametrically offset about said opening;

said outer plate rotating on said intermediate plate between said at least two stop tabs.

9. The seat belt anchor recited in claim 8, wherein said outer plate has a stepped construction with a base plate portion and an offset plate portion parallel to said base plate portion.

10. The seat belt anchor recited in claim 9, wherein said stepped construction further includes at least one reinforcement member extending between said base plate portion and said offset plate portion.

11. A vehicle seat comprising:

a seatback;

a seat cushion extending substantially perpendicularly from said seatback;

a side structure extending laterally from said seat cushion;

said seat belt anchor recited in claim 8, with said first plate portion of said bracket attached to said side structure; and a belt webbing attached to said outer plate.

12. A vehicle passenger cabin comprising:

a floorpan having a longitudinal axis; and said vehicle seat recited in claim 11, with said seat cushion attached to said floorpan;

said seat belt anchor offset from said floorpan;

at least one of said outer plate, said intermediate plate, and said second plate portion of said bracket substantially perpendicular to said floorpan;

said outer plate pivoting on said intermediate plate between a forward direction and a rearward direction along said longitudinal axis of said floorpan.

* * * * *